Oct. 1, 1957
E. S. BARNES
2,807,981
SIGHTING TELESCOPE
Filed March 14, 1955
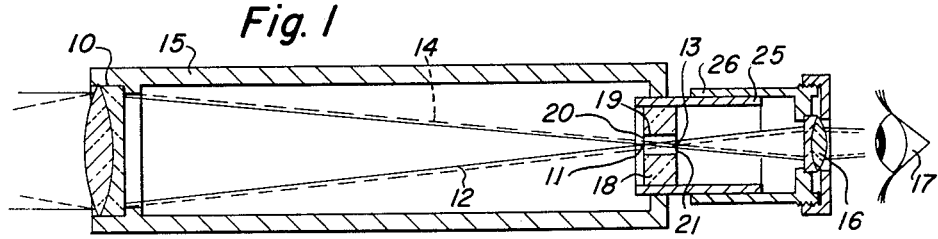
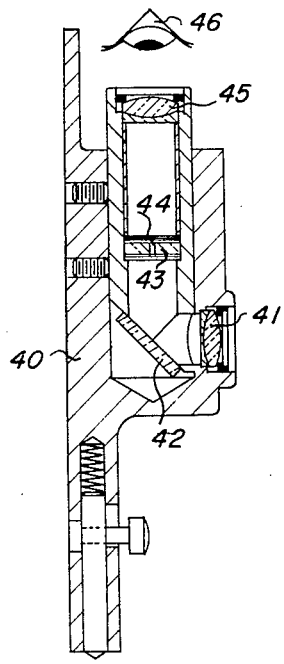
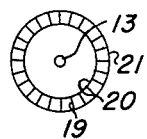
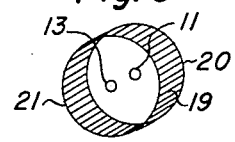
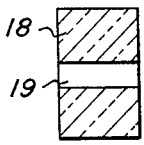 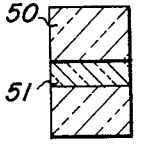 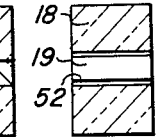 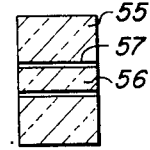
EDGAR S. BARNES
INVENTOR.
BY Daniel I. Mayne
F. M. Emerson Holmes
ATTORNEYS United States Patent Office 2,807,981
Patented Oct. 1, 1957

2,807,981

SIGHTING TELESCOPE

Edgar S. Barnes, Rochester, N. Y., assignor to Eastman Kodak Company, Rochester, N. Y., a corporation of New Jersey Application March 14, 1955, Serial No. 494,087

10 Claims. (Cl. 88—32)

This invention relates to telescope aligners and particularly to reticles for such instruments.

It is common practice to use lower power telescopes as aligning devices. The type to which the present invention relates consists essentially of an objective for forming an image of the object being sighted, an eyepiece for viewing the image, and a reticle or crosshair located in the image plane. When sighting on objects at different distances, it is necessary with such telescopes to refocus each time so as to move the crosshairs to the image plane. This refocusing introduces some error since it is not possible to make an absolutely perfect focusing mechanism. Even for a single setting, the actual image may be in front of or behind the reticle without the observer being aware of the fact, in which case alignment errors are liable to creep in due to parallax. The latter errors are eliminated if some means are provided for insuring that the observer's eye is always on the optic axis of the objective.

The present invention is particularly useful as an auxiliary sighting system for use with axicon aligners since the latter are so precise that it is difficult to be sure that the axicon image is going to be somewhere in the field of view unless some precaution is taken to be sure that the axicon aligner is at least approximately aligned before any tests are made therewith. The present invention serves admirably for this purpose, especially since the present invention and axicon aligners have in common the peculiar advantage of being able to sight either simultaneously or alternatively on objects at different distances. No telescopic system is as precise as an axicon system when alignment of objects or points at different distances is involved, but among telescopic systems the present one is the most efficient for this purpose and hence serves admirably as a pre-aligner for an axicon system.

This is, of course, only one possible use of the present invention which can be used in any procedure involving sighting on objects at different distances.

According to the invention the reticle of a telescopic system is made in depth and is fixed relative to the objective. In its simplest form the reticle consists of a fine hole drilled paraxially through a thick block of transparent material such as plastic located in the image plane of the telescope objective. The front end of the hole; i. e., the front surface of the transparent block, should be approximately at the focal plane of the objective and the rear end of the hole or rear face of the transparent block should be far enough back to cover the required depth of focus; that is, to accommodate the range of object images being sighted.

The telescope system includes an objective for forming an image on this depth reticle and an eyepiece for viewing the image and the reticle. The focal length of the eyepiece preferably equals that of the objective, so as to have a unit power telescope, but may have any value between one quarter and two times the focal length of the objective. There are a series of interrelationships which are more or less necessary for optimum operation of the invention. For example, the length of the reticle in depth is determined by two factors. First, it must cover the range of image planes, which range depends on the focal length of the objective. Second, except in those embodiments of the invention in which the eyepiece is focused relative to the reticle, it should have a length no greater than can be accommodated by the eye of the observer. This depends on the age of the observer and on the focal length of the eyepiece. This question of accommodation is not too critical since the present invention can be made to work even for those observers whose accommodation range is quite low indeed. However, it is this interrelationship which causes the preferred range of eyepiece focal lengths to be between ¼ F and 2 F where F is the focal length of the objective.

A range of object distances between 2 feet and infinity requires the depth reticle to have a certain length. If the focal length $f$ of the eyepiece were less than ¼ F, the depth reticle would be far too long compared to the accommodation range of some observers. As pointed out below, there is some tolerance even for this factor since the present invention works quite well even for observers who see the ends of the depth reticle slightly out of focus. There is little point in making the eyepiece focal length much greater than 2 F and, of course, such minification is not generally desirable in an aligner.

The length of the depth reticle as far as normal eye accommodation is concerned should be somewhere between .05 $f$ and .3 $f$ where $f$ is the focal length of the eyepiece. In the preferred embodiment of the invention in which $f$ approximately equals F, this latter relationship can be taken into account when defining the length of the reticle in terms of the focal length F of the objective.

The diameter of the reticle tube for best results should be within some reasonable limits. The accuracy increases as the diameter of the reticle goes down, but a reasonable degree of accuracy can be obtained with a reticle whose diameter is .1 F. There is no point in having the diameter too small although theoretically even a fine line well defined in space that is not a tube at all could meet the mathematical relationships required for the depth reticle. In practice, however, the observer wants to see the object image through the reticle or inside the reticle and finds a reticle diameter less than .01 F objectionable. Thus the diameter fo the reticle should be between .01 F and .1 F where F is the focal length of the objective.

Any tiny tube suspended in space would constitute a satisfactory depth reticle. The simplest way of providing such a reticle is by drilling a hole in a transparent block of material and either leaving the air hole or filling the hole with some material, provided, however, that the sides of the hole are sharply delineated. The sides of the hole are usually quite rough, particularly when viewed longitudinally; and in the telescope, the tube appears to be grey or black. It is difficult to realize when looking through the telescope that the reticle consists, in the simplest embodiment, of merely a hole drilled in transparent plastic.

Alternatively the hole could be filled with a different refractive material as long as the boundaries are delineated by a difference in index of refraction or the index of refraction could be exactly the same providing the boundary surfaces were otherwise delineated, for example, by being colored.

The image of a distant object is focused near the front end of the reticle tube. Objects closer to the telescope are focused part way along the tube and the closest objects have their image near the rear end of the tube.

Persons who can accommodate over the range of image distances thus presented to the eyepiece do not have to refocus at all since it turns out to be quite convenient for the observer to compare the image with that part of the reticle which is in the image plane. Thus the depth reticle works quite satisfactorily for young observers or any observer who can accommodate over this range. On the other hand, the present reticle also works for older people who are unable to accommodate and who hence may see the image somewhat out of focus. They may either refocus the eyepiece but without moving the reticle relative to the objective and hence without introducing any error, or they may put up with the out-of-focus image. In practice an older observer usually does the latter since one of the features of the present invention is the speed with which it can be used. What happens in this latter case is that the observer sees both ends of the tubular reticle simultaneously although one or the other may appear slightly fuzzy and he automatically holds his eye so that these two ends appear concentric. Then he automatically aligns his eye along the axis of the telescope objective. The image which he also sees even though it is slightly out of focus is always definite enough for him to determine whether it too is concentric with the reticle bore and hence he automatically determines proper alignment of the telescope.

Simple tubes have, of course, been used as gun sights, but the present invention is concerned only with the use of tubes as reticles in a telescopic sight. It is interesting when one moves one's eye to one side of the eyepiece to see the side of the reticle tube but to notice that the image stays centered in that part of the tube which is in the same plane as the image.

The invention will be more fully understood by the following description when read in connection with the accompanying drawings in which:

Fig. 1 is a schematic vertical section of a preferred embodiment of the invention;

Figs. 2 and 3 illustrate the field of view in such instruments;

Fig. 4 is a vertical section of a telescope aligner incorporating this preferred embodiment of the invention;

Figs. 5 to 8 inclusive are greatly enlarged vertical sections of various forms which the reticle according to the present invention may take:

In Fig. 1, a telescope objective 10 forms an image 11 of a distant object, the rays of light being represented by solid lines 12. Similarly it forms an image 13 of a nearby object, the rays of light being represented by broken lines 14. Either of these images is viewed through an eyepiece 16 by the eye 17 of an observer. The object may be a point source of light, but need not be since the telescope gives quite a bright image. The aligner can easily see and select a point on any illuminated target.

According to the invention a reticle is provided in the image plane consisting of a transparent block 18 with a paraxial hole 19 whose length includes the image planes of the images for all the object distances which are intended to be viewed by the instrument. The ends 20 and 21 of the tube 19 constitute the limits of the depth of focus of the instrument. The image of any intermediate object would be focused in a plane somewhere along the tube 19 and can be compared with the sides of the tube in that particular plane.

If crosshairs were used, it would be necessary to refocus the whole system moving the crosshairs relative to the objective 10 in order to bring the crosshairs into the plane of the image. Errors would be introduced by the focusing operation. Contrarywise if the instrument were not refocused, the observer might well introduce errors due to parallax between the crosshairs and the image merely by moving his head slightly to one side without realizing it. The essential feature of the present invention is the fact that the reticle remains fixed relative to the objective 10. This rigid connection is provided by the telescope housing 15.

If the observer whose eye is indicated at 17 is young or has not lost his ability to accommodate he probably can accommodate for all image distances between 11 and 13. In this case there is no need to refocus the eyepiece and he will see the whole length of the tube 19 relatively sharp. Practically all observers do see it sharp, either unaided or with the glasses they normally wear. The reticle appears as a tunnel extending out into space. However, even if the observer cannot accommodate, he has his choice of how to operate the present invention. He may focus the eyepiece 16 relative to the reticle tube 19 merely by sliding the sleeve 26 carrying the eyepiece 16 along the sleeve 25 which constitutes the mount for the reticle block 18. It should be noted that this operation constitutes focusing the eyepiece 16 relative to the reticle but does not involve moving the reticle relative to the objective 10 and hence there is no source of error involved in this particular type of focusing operation. Alternatively the observer may not bother to refocus the eyepiece 16 and may put up with the fact that the image is slightly out of focus for him. He will see the ends 20 and 21 of the reticle tube. One or the other of them may be somewhat out of focus; it will still be sufficiently definite for him to know whether or not they are concentric. When they appear concentric, (practically superimposed so that he sees a circle rather than a tipped tube) he will have his eye on the axis of the telescope objective 10 and there will be no parallax errors. The out-of-focus image will merely have to be made concentric with the ends 20 and 21 which are already concentric as viewed by this observer.

Fig. 2 shows the field of view seen head on (i. e., with the eye axially aligned). The ends 20 and 21 of the reticle tube appear concentric. In fact they appear to be practically the same size so as to present a sharply defined circle. The images 11 and 13 appear superimposed, 13 being nearer the observer. In practice, of course, even young observers tend automatically to align their eye when looking through the tube.

In Fig. 3 the ends 20 and 21 of the tube 19 are not concentric and this means that the observer's eye is not properly aligned. The reticle appears as a dark tube seen obliquely. The image at 11 or 13 may be fuzzy, but still sufficiently sharp to determine accurately when the image is concentric. If the tube appears not tipped and the image appears concentric, the observer knows that the instrument is properly aligned. He may or may not bother to focus the eyepiece 16 relative to reticle 18.

Fig. 4 shows a sighting telescope of this type mounted on the cover plate of an axicon, not shown, but described in the cofiled application of John H. McLeod, Serial No. 494,089, filed March 14, 1955, now Patent No. 2,775,918, issued January 1, 1957. The cover 40 is essentially a circular disc. According to the present invention a telescope objective 41 with its axis orthogonal to the cover plate 40 and passing through its center receives light from an object under test and by means of a mirror 42 focuses it in a transparent block 43 having a paraxial hole 44 drilled therein. This image and the reticle are viewed through an eyepiece 45 by the eye 46 of an observer. The operation of the invention is the same as described in Fig. 1.

Fig. 5 is a greatly enlarged view of the reticle shown in Fig. 1 and consists of a transparent block 18 having a paraxial hole 19. The sides of the hole are not absolutely smooth and appear grey or dark when viewed highly magnified through the eyepiece.

Fig. 6 shows a similar arrangement in which the main block 50 and the paraxial part 51 are both made of transparent solids, but of different indices of refraction so that the boundary surface between the two parts is delineated. This turns out to be less satisfactory than the simple, slightly rough hole.

Fig. 7 differs from Fig. 5 by having the boundary surfaces coated with a transparent colored coating 52. As shown in Fig. 8 the parts 55 and 56 of the reticle can have the same index of refraction providing a colored layer 57 is employed to delineate the required boundaries. This is perhaps the most pleasing form of reticle according to the present invention since magnification inside and outside the tube are identical, but the arrangement shown in Figs. 1 and 5 is the simplest to manufacture and has proven to be quite satisfactory. The magnification difference is barely detectable.

I claim:

1. A sighting telescope for viewing objects over a range of distances from the telescope, comprising an objective for forming an image of the object, an eyepiece for viewing the image and a depth reticle at the image plane fixedly mounted relative to the objective and consisting of a thick block of transparent material, the paraxial part thereof, narrow tubular in form, being sharply delineated from the rest, the length of the paraxial tubular part including the image planes for images of all objects within said range of object distances.

2. A sighting telescope according to claim 1 in which the diameter of the tubular part is between .01 F and .1 F where F is the focal length of the objective.

3. A sighting telescope according to claim 1 in which the focal length of the eyepiece is between ¼ and 2 times that of the objective.

4. A sighting telescope according to claim 1 in which the length of the tubular part is between .05 $f$ and .3 $f$ where $f$ is the focal length of the eyepiece.

5. A sighting telescope according to claim 1 including means for focusing the eyepiece relative to the reticle without moving the reticle relative to the objective.

6. A sighting telescope for viewing objects over a range of distances from the telescope, comprising an objective for forming an image of the object, an eyepiece for viewing the image and a depth reticle at the image plane fixedly mounted relative to the objective and consisting of a thick block of transparent material, with a thin paraxial hole whose diameter is between .01 F and .1 F where F is the focal length of the objective and whose length includes the image planes for images of all objects within said range of object distances.

7. A sighting telescope according to claim 6 including means for focusing the eyepiece relative to the reticle without moving the reticle relative to the objective.

8. A sighting telescope according to claim 6 in which the walls of the hole are colored.

9. A sighting telescope for viewing objects over a range of distances from the telescope comprising an objective of focal length F for forming an image of the object, an eyepiece whose focal length is between ¼ F and 2 F for viewing the image and a depth reticle at the image plane fixedly mounted relative to the objective and consisting of a thick block of transparent material the paraxial part thereof, narrow tubular in form, being sharply delineated from the rest, with a diameter between .01 F and .1 F and a length including the image planes for images of all objects within said range of object distances.

10. A sighting telescope for viewing objects over a range of distances from the telescope comprising an objective of focal length F for forming an image of the object, an eyepiece whose focal length approximately equals F for viewing the image and a tubular depth reticle forming a paraxial tube concentric with the optic axis of the objective and fixedly mounted with the front end of the tube approximately at the focal plane of the objective, the length of the tube being between .05 F and .3 F and the diameter of the tube being between .01 F and .1 F.

References Cited in the file of this patent

UNITED STATES PATENTS

| | | |
|---|---|---|
| 591,153 | Berger | Oct. 5, 1897 |
| 848,757 | Lomb et al. | Apr. 2, 1907 |
| 883,267 | Williams | Mar. 31, 1908 |
| 1,931,552 | Maris | Oct. 24, 1933 |
| 2,171,571 | Karnes | Sept. 5, 1939 |
| 2,261,978 | Dircksen | Nov. 11, 1941 |
| 2,588,974 | Fontaine | Mar. 11, 1952 |

FOREIGN PATENTS

| | | |
|---|---|---|
| 731,183 | Germany | Feb. 19, 1943 |